(12) United States Patent
McEwan (10) Patent No.: US 6,747,599 B2
(45) Date of Patent: Jun. 8, 2004

(54) RADIOLOCATION SYSTEM HAVING WRITING PEN APPLICATION

(75) Inventor: Thomas E. McEwan, Carmel Highlands, CA (US)

(73) Assignee: McEwan Technologies, LLC, Las Vegas, NV (US)

(\*) Notice: Subject to any disclaimer, the term of this patent is extended or adjusted under 35 U.S.C. 154(b) by 138 days.

(21) Appl. No.: 09/975,591

(22) Filed: Oct. 11, 2001

(65) Prior Publication Data
US 2003/0071754 A1 Apr. 17, 2003

(51) Int. Cl.⁷ .................................................. G01S 3/02
(52) U.S. Cl. ........................................ 342/463; 342/465
(58) Field of Search ................................ 342/463, 465; 367/907; 178/18.01, 18.03, 18.07, 19.06

(56) References Cited

U.S. PATENT DOCUMENTS

| 4,246,439 A | 1/1981 | Romein |
| 4,806,707 A | 2/1989 | Landmeier |
| 4,961,138 A | 10/1990 | Gorniak |
| 5,012,049 A | 4/1991 | Schier |
| 5,159,321 A | 10/1992 | Masaki et al. |
| 5,247,137 A | 9/1993 | Epperson |
| 5,294,792 A | 3/1994 | Lewis et al. |
| 5,308,936 A | 5/1994 | Biggs et al. |
| 5,381,160 A | 1/1995 | Landmeier |
| 5,548,092 A | 8/1996 | Shriver |
| 5,589,838 A | 12/1996 | McEwan |
| 5,739,479 A * | 4/1998 | Davis-Cannon et al. |
| 5,854,449 A | 12/1998 | Adkins |
| 5,945,981 A | 8/1999 | Paull et al. |
| 5,977,958 A | 11/1999 | Baron et al. |
| 6,055,287 A | 4/2000 | McEwan |
| 6,072,427 A | 6/2000 | McEwan |
| 6,128,007 A | 10/2000 | Seybold |
| 6,137,438 A | 10/2000 | McEwan |
| 6,151,015 A | 11/2000 | Badyal et al. |
| 6,184,873 B1 | 2/2001 | Ward et al. |
| 6,188,392 B1 | 2/2001 | O'Connor et al. |
| 6,191,724 B1 | 2/2001 | McEwan |

\* cited by examiner

Primary Examiner—Theodore M. Blum
(74) Attorney, Agent, or Firm—Weide & Miller, Ltd.

(57) ABSTRACT

Two or more receivers of known location receive RF bursts from a wireless moving object containing a transmitter that transmits periodic RF bursts. The receivers are gated with precision swept timing that repeats at the exact transmit RF burst period to produce precision expanded time representations of the received RF bursts. The expanded time representations correspond to RF burst arrival times from the transmitter, which are used to calculate the location of the transmitter. A writing pen application includes an RF transmitter in a writing pen and four RF receivers beneath the surface of a writing tablet where RF propagation from the pen to the receivers cannot be blocked by a user's hand. Two RF transmitters, one located at each end of the pen, may be employed to measure pen tilt and for 3-D tracking. Spatial resolution is more than 600 dpi at 100 location fixes per second.

21 Claims, 9 Drawing Sheets

300 dpi optical scan

FIG. 9a

Radiolocation pen output from
10cm x10cm, 9x9 bit tablet (128dpi)

FIG. 9b

Fine print    Expanded Fine print    Further Expanded

Radiolocation pen with analog display 300 dpi optical scan

FIG. 9c

RADIOLOCATION SYSTEM HAVING WRITING PEN APPLICATION

BACKGROUND OF THE INVENTION

1. Field of the Invention

The present invention relates to radiolocation systems, and more particularly to very short range pulsed microwave time-of-arrival systems. These systems can be used for wireless handwriting digitizing, a wireless computer mouse, machine automation, or virtual reality systems.

2. Description of Related Art

Precision short range location systems have employed ultrasound, optical, magnetic, inertial, and radio frequency (RF) technologies to locate a wireless moving object such as a writing pen for digitizing handwriting. While each technology has advantages, their disadvantages appear to have limited their widespread use.

Wireless pen location based on time-of-arrival (TOA) of ultrasound pulses can provide, at first glance, a highly accurate, low cost digitized handwriting system. However, the limitations to ultrasound are numerous and essentially insurmountable: (1) the speed of sound varies 10% over common outdoor temperature, greatly limiting accuracy, (2) ultrasonic noise from computer monitors, jangling keys, etc. reduce reliability, (3) propagation path blockage by a user's arm or hand limit the choice of transducer locations to the top of the writing tablet, leading to severe geometric dilution of precision (DOP), (4) most ultrasonic transducers are highly directional, limiting coverage across a writing tablet, and (5) slow acoustic propagation velocity limits the pulse rate (due to range ambiguities), limiting response time to only accommodate slow handwriting.

Inertial location techniques use accelerometers mounted in a writing pen to provide position information by integration of acceleration signals. There is no absolute positional reference frame, forcing the user to locate writing position on a computer screen, like a mouse. Accuracy is limited by drift in the integrators needed to convert acceleration to position. In addition, low cost high accuracy accelerometers are not available, leaving inertial writing pen technology to specialty or high-end markets.

Magnetic writing pens employ a coarse X–Y wire grid under a writing tablet to detect oscillating magnetic fields from the tip of a writing pen, where the position between the nearest wires is interpolated from magnetic signal strength. Since magnetic field strength varies with the cube of range for close-in fields, interpolation can be difficult unless the grid spacing is kept small, requiring a large number of detectors or multiplexers. Movement of the pen in the Z-direction (above the tablet) would substantially alter the magnetic field gradient and the interpolation accuracy, preventing use with a thick pad of paper, and preventing 3-D operation.

Optical writing pens use light emitting diodes or lasers mounted in the pen and position sensitive detectors (PSD) mounted on a writing tablet or nearby fixture to locate the pen's position. The PSD is formed with several photodiodes and lenses or with a strip-like photodiode and lens. In either case, proportional analog voltages are produced as a function of pen location, with an accuracy limited to perhaps 1% of full tablet range by photodiode gain differences, dark currents, image size and focus variations, background illumination, etc. Accuracy is also limited by the choice of PSD locations, which are confined to the top of the writing tablet where a user's arm or hand will not block the light path, leading to severe geometric dilution of precision. Battery power limitations in the pen limit optical output power, and consequently, the signal-to-noise ratio at the photodiode receiver output, thereby limiting the ability to track fast handwriting. Optical devices are at a fundamental disadvantage to RF devices since photodetectors generally provide 30 to 60 dB lower output than a comparable microwave system with the same transmit drive power and range, and photodiodes cost more than a simple microwave antenna.

U.S. Pat. No. 5,589,838, "Short Range Radio Location System," to McEwan, 1996, describes a time-of-arrival system employing a wireless "rover" (i.e., moving object) that transmits short microwave pulses at an RF frequency of 2 GHz. An array of two or more receivers at known locations samples the RF environment to determine the relative arrival times of the transmitted pulses. The arrival times are converted to relative distances and the exact location of the rover is determined using simple geometric relations.

A key feature of the '838 patent is the use of two-frequency timing. The receivers sample the RF environment at a first pulse repetition frequency $PRF_R$ that is slightly offset from a second frequency, the transmit pulse repetition frequency $PRF_T$, by a frequency $\Delta$. For example, $PRF_T$ is 2,000,000 Hz and the receivers all sample with an offset frequency $\Delta$ of 100 Hz at a second frequency $PRF_R$ of 2,000,100 Hz (or 1,999,900 Hz). The offset frequency in the receiver, $PRF_R$, causes the sample timing to slip 360° in phase once each $1/\Delta$ seconds. This phase slippage causes the sampled output of the receivers to produce an equivalent time replica of the 2 GHz RF pulses on a time scale related to the offset frequency $\Delta$, i.e., the phase slippage rate. There is a time expansion factor $EF=PRF_T/\Delta=20,000$ for $\Delta=100$ Hz and $PRF_T=2$ MHz, and the transmit pulse repetition interval $PRI_T=1/PRF_T$ is expanded from ½ MHz=500 ns to a receiver output pulse repetition interval of F/2 MHz=10 ms. Thus, the arrival time signals from the receivers appear on a 20,000 times slower time scale, which makes precision detection and processing of the signals vastly simpler. This is important to many applications, such as handwriting digitizing, that require sub-picosecond accuracy.

A handwriting digitizing application of the techniques disclosed in the '838 patent, using time-of-arrival receivers operating with two-frequency timing, is disclosed in U.S. Pat. No. 5,977,958, "Method and System for Digitizing Handwriting," to Baron, 1999.

SUMMARY OF THE INVENTION

According to the invention, a wireless transmitter mounted in a movable object, e.g., a handwriting pen, transmits microwave RF bursts at a PRF of 10 MHz (or any other selected frequency). Two or more receivers sample the microwave RF environment at the same 10 MHz rate. Upon receiving RF bursts from the transmitter, timing circuitry coupled to the receivers locks its 10 MHz PRF to the transmit 10 MHz PRF (with no offset $\Delta$). Once locked, there is no phase slippage between the transmit PRF and the receive PRF since they are locked to exactly the same frequency and phase. A swept timing circuit sweeps the sample timing to produce expanded time representations of the RF bursts that are suitable for precision processing into location fixes.

A key advantage to the use of RF bursts for handwriting digitization is the ability to locate receive antennas below a dielectric writing surface, including a thick pad of paper, where the RF propagation path cannot be blocked by a user's arm or hand, or by the writing paper itself. Receive antennas can be located at the four corners of the tablet and at other locations below the writing surface, if desired, to essentially eliminate geometric dilution of precision. In addition, the pen may be accurately tracked while it is several inches (or more) above the tablet, allowing the pen to serve multiple functions as a writing instrument, a mouse and a joystick.

The present invention provides for operation with more than one transmitter housed within the moving object (or pen). This is accomplished by time-spacing the pulses from the additional transmitters. The use of two transmitters in a handwriting-digitizing pen provides pen tilt and inversion information, and facilitates 3-D location fixes with all the receiver antennas located below the writing surface.

A further advantage to the use of RF bursts is that short propagation times from a writing pen to receive antennas allow the use of very high pulse rates with a corresponding fast tracking rate of the pen and minimal dynamic distortion of written characters. Also, omni-directional antennas inside the writing pen make the pen rotationally independent and free the pen from transducer aperture blockage by the user's hand (as may be the case with ultrasound or optical systems).

Yet another advantage of the present invention is the use of a very linear timing sweep, which provides inherently linear scale factor while providing a higher signal-to-noise ratio, i.e., lower jitter, than the prior art.

Applications for the radiolocation system include handwriting digitizing, wireless computer input devices such as a computer mouse (which can, for example in combination with a handwriting pen, control point, click, drag, pen writing line thickness and color, and paging functions), automated machinery control such as numerically controlled machines and digital surgery devices (scalpel location), virtual reality systems (including head position location, e.g., for pilots to control aircraft functions and for vehicle drivers), gambling machines (e.g., CRT-pen input), CRT/LCD based games with a pen input, and inventory tracking, e.g., for warehouses.

BRIEF DESCRIPTION OF THE DRAWINGS

FIG. 1b is a side view of FIG. 1a.

FIG. 2b is a block diagram of the wireless handwriting pen of FIG. 2a.

DETAILED DESCRIPTION OF THE INVENTION

A detailed description of the present invention is provided below with reference to the figures. While illustrative circuits are given, other embodiments can be constructed with other circuit configurations. While illustrative parameter values, e.g., frequency, are given, other values may be used. All U.S. Patents and copending U.S. applications cited herein are herein incorporated by reference.

Figure 1A:
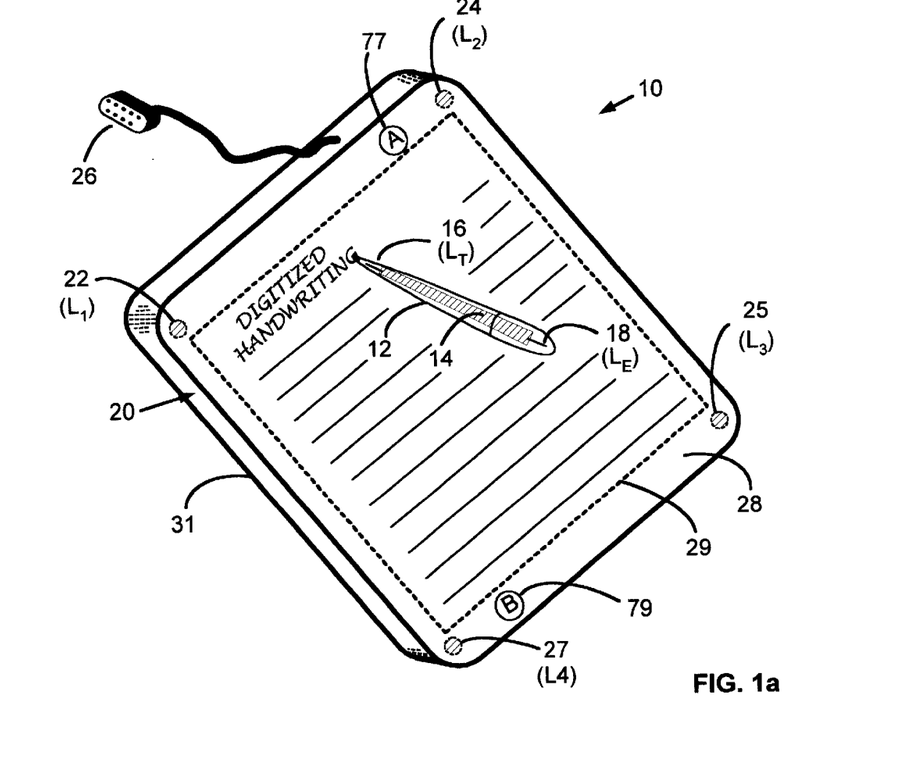
FIG. 1a depicts a wireless handwriting pen and tablet of the present invention.

FIG. 1a depicts a wireless system for digitizing handwriting using a radiolocation system 10 of the present invention. A wireless pen 12 contains a printed circuit board 14 and writing tip antenna 16 at location $L_T$ and an eraser end antenna 18 at location $L_E$. Both antennas 16 and 18 radiate 5.8 GHz RF pulses at a PRF of 10 MHz (both these frequencies are illustrative; the invention may be implemented at other frequencies). Circuit board 14 contains circuitry to produce the RF pulses, which will be discussed in detail with respect to FIG. 2b.

Surface 28 of writing tablet base 20 is generally covered with a pad 29 (or single sheet) of standard writing paper to facilitate user feedback and provide instant hardcopy. Surface 28 may also be covered with a slick plastic material or an erasable "etch-a-sketch" material. Surface 28 may also be a computer CRT face or LCD or other display, which may additionally display handwriting acquired from system 10 in realtime. In this case, tablet 20 forms a frame around the CRT/LCD.

Receive antennas 22, 24, 25 and 27 (indicated by black circles) are positioned at locations $L_1$, $L_2$, $L_3$ and $L_4$ respectively on tablet 20. Other antennas can be optionally distributed to improve geometric precision of location of the pen. Fewer than four antennas, i.e., two or three antennas, may be used in a simple system. The antennas may be patch antennas that are flush with writing surface 28, or for example, they may be monopoles recessed below surface 28, as will be discussed with reference to FIG. 1b. Optionally, at least one or more receive antennas may be located above tablet surface 28 to improve geometric precision of location when the pen is lifted above the writing surface or when the pen is tilted; these antennas may be mounted on an elevated display panel of a laptop computer, for example.

RF pulses emitted from antennas 16 and 18 on the pen are received by the antennas, and reception and timing circuitry located inside tablet 20 receive and process the pulses to produce digital representations of the relative arrival times of the RF pulses.

Connector 26 couples the digital representations to a computer, which acquires a series of such representations and calculates pen location versus time to produce direct sketches of the handwriting as a first step, and as an optional second step, to produce alphanumeric characters using optical character recognition (OCR). Curve prediction and smoothing algorithms, optionally including ballistic prediction techniques, may be employed to improve handwriting accuracy, particularly during rapid writing motion, and consequently, OCR accuracy. The use of two antennas, 16 and 18, on each end of the pen substantially improves pen location accuracy; however, the system functions very well with only one antenna located at the writing tip of the pen. As will be discussed with respect to FIG. 2b, pulses radiated from eraser end antenna 18 are switched-on when a pressure switch on the tip of the pen is closed (not shown in FIG. 1), indicating a pen-down writing condition. A switch located on the barrel of pen 12 (not shown) may function in addition to, or instead of, a pen end pressure switch to signal computer operations as point, click and drag. When radiolocation data indicate the pen is upside-down, the pen is considered to be in the "erase" mode and a pressure switch on the eraser end of the pen (not shown in FIG. 1) activates emissions from the eraser end to enable an erase process at a computer.

One or more known locations, labeled A and B, for example may be used to calibrate the system. One or more switches (represented by circles enclosing A and B in FIG. 1 and shown as switches 77, 79 in FIG. 3) may be mounted under writing surface 28 at locations A and B that are responsive to pressure from pen 12 to signal a calibration procedure to a location calculator (part of the computer to which connector 26 is attached) 76 of FIG. 3. The computer then adjusts its location parameters for a solution at the location of the switch currently being pressed. Alternatively, the computer may instruct the user to place the pen at location A or B and then press down to start a calibration procedure after receipt of a pen-down signal from the pen's eraser end antenna 18 (for example). Calibration removes small timing offsets and scale factor errors from radiolocation system 10 that may arise at the tens of picoseconds level. Since 1 mm accuracy corresponds to 3.3 ps of one-way RF burst travel time, some form of calibration is useful for applications requiring sub-1 mm absolute accuracy. Switches 77, 79 at locations A and B (or others) may also be used as function switches to control parameters of the computer, such as pen writing color (on the computer screen); however, switches 77, 79 may not be needed if RF bursts are switched on or off at locations A and B in response to downward pressure on the pen.

Pen 12 can also be used as a wireless pointing and control device, much like a computer mouse or joystick, with the added advantage that it operates several inches or more above writing surface 29, providing increased freedom for the user or providing 3-D input to a computer or other device. Connector 26 may also couple to automated machinery, digital surgery devices or virtual reality devices. In these cases, pen 12 would no longer be a writing pen; rather, it would be an appropriate moving object incorporating pulsed RF transmitters of the present invention. Connector 26 may also be coupled to an RF or optical wireless link to a computer of other device; the data rate is comparable to that of a computer mouse.

Mathematical relations for calculating pen location from the time-of-arrival digital representations on connector 26 can be found in U.S. Pat. No. 5,012,049, "Position Determining Apparatus," to Schier, or U.S. Pat. No. 5,308,936, "Ultrasonic Pen-Type Data Input Device," to Biggs et al., 1994. Although these patents may pertain to ultrasonic systems, the geometric relations remain the same (after adjusting for the differences between the speed of sound for the prior art and the speed of light of the RF pulses of the present invention).

Figure 1B:
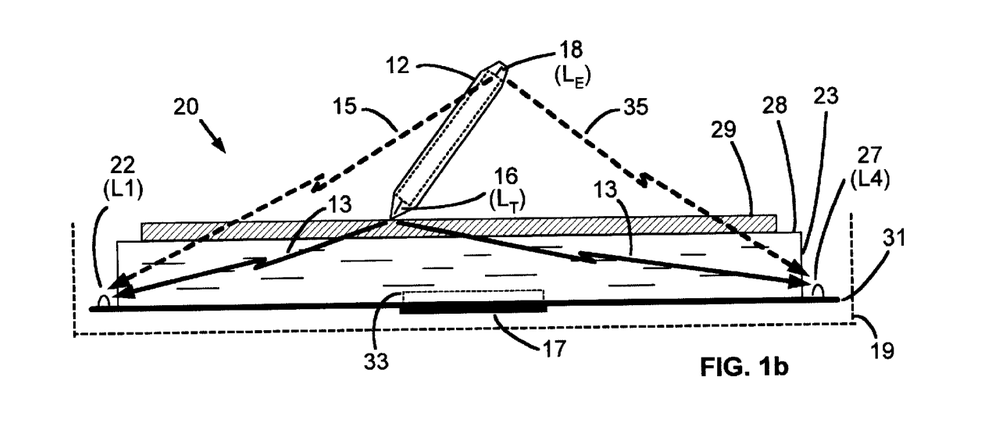

FIG. 1b is a side view of tablet 20 showing base 31, which is a printed circuit board, dielectric foam layer 23 with surface 28, and writing paper pad 29. Antennas 22, 27 are located at the ends of base 31 (antennas 24, 25 are not visible in this view but are behind antennas 22, 27). The antennas are shown as loop antennas, which exhibited desirable RF phase characteristics in a prototype, but they may be of other well-known designs such as a monopole. Electronic circuitry at illustrative location 17 may be located on the bottom side of circuit board (base) 31 or optionally on its top side at illustrative location 33. A cosmetic metal or plastic housing 19 may surround tablet 20.

A key advantage to tablet 20 is the fact that a user cannot block RF paths 13 from the writing tip antenna 16 to the receive antennas by placing a hand or arm anywhere on writing surface 28. However, RF paths 15, 35 from the eraser end antenna 18 can be blocked, making the use of a two-transmitter system in pen 12 less attractive, although RF path 15 from pen eraser end 18 to the top of tablet antennas 22, 24 may be less likely to be blocked. Dielectric foam layer 23 may be formed with any RF transparent material, although light foam of low dielectric constant material is preferred to ensure negligible bending of RF propagation paths 13, 15, and 35. Foam layer 23 may include a smooth, hard surface 28 on which to write. Experiments show negligible propagation loss at 5.8 GHz operating frequency using dense packing foam layer 23 and ¼ inch thick paper writing pad 29. There will be some geometric distortion introduced by propagation delays through the writing pad, which in practice appear to amount to less than a few millimeters and in any case are predictable and can be computationally corrected for or can be calibrated out.

Figure 1C:
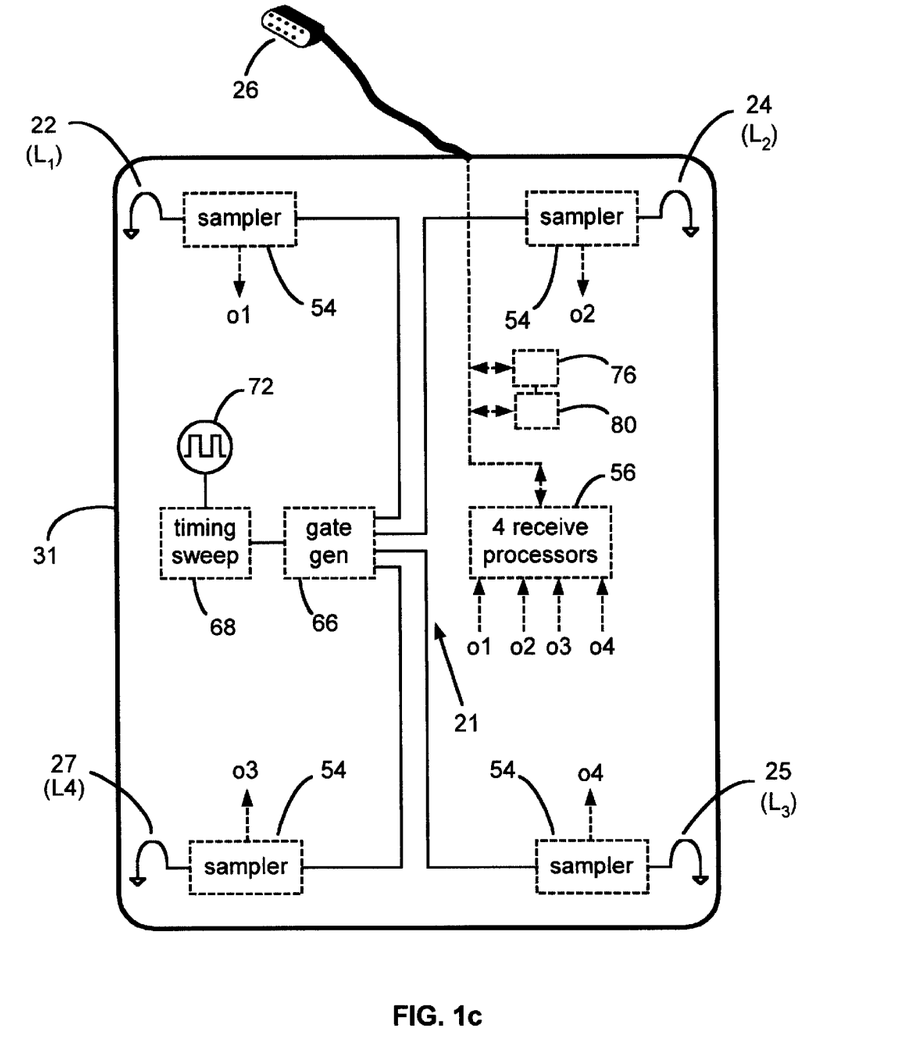
FIG. 1c is a circuit board layout of a handwriting tablet of the present invention.

FIG. 1c is a sketch of circuit board (base) 31 showing schematically the location of antennas 22, 24, 25, and 27; samplers 54; four receive processors 56; PRF generator 72; timing sweep 68; and gate generator 66 (which are described below). Close time alignment of the samplers 54 is assured by equal length layout of microstrips 21 connecting gate generator 66 to samplers 54. Optional location calculator 76 and processor 80 (described below) may be located on circuit board 31 (or within tablet 20) so tablet 20 can record, calculate, or calculate and record pen movements for later playback into a computer or for independent control of a machine, much like a pantograph, or a game, etc.

Figure 2A:
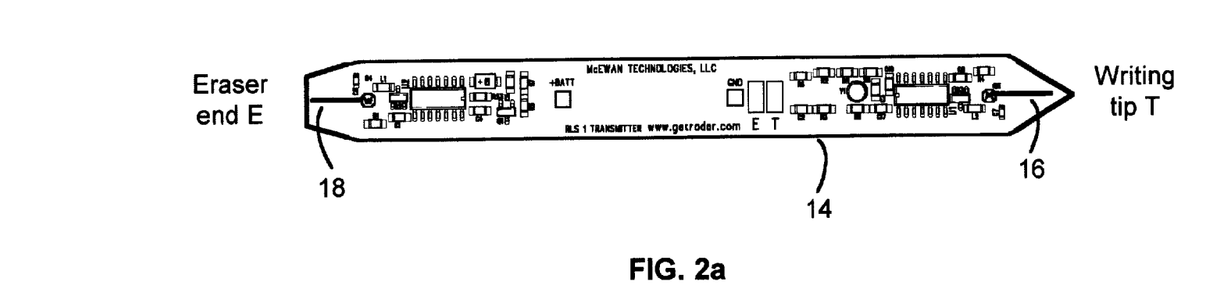
FIG. 2a shows a prototype layout for a wireless handwriting pen of the present invention.

FIG. 2a shows a circuit board layout 14 for wireless writing pen 12. Antenna 16 resides on the writing tip end and antenna 18 resides on the eraser end. Both antennas are quarter-wave monopoles, which naturally exhibit a symmetric radiation pattern about their axes, which frees the user from having to rotationally orient the pen. Naturally, other antenna types may be used, and in particular, a much shorter monopole antenna may be used for extremely short-range applications such as this wireless writing pen.

Figure 2B:
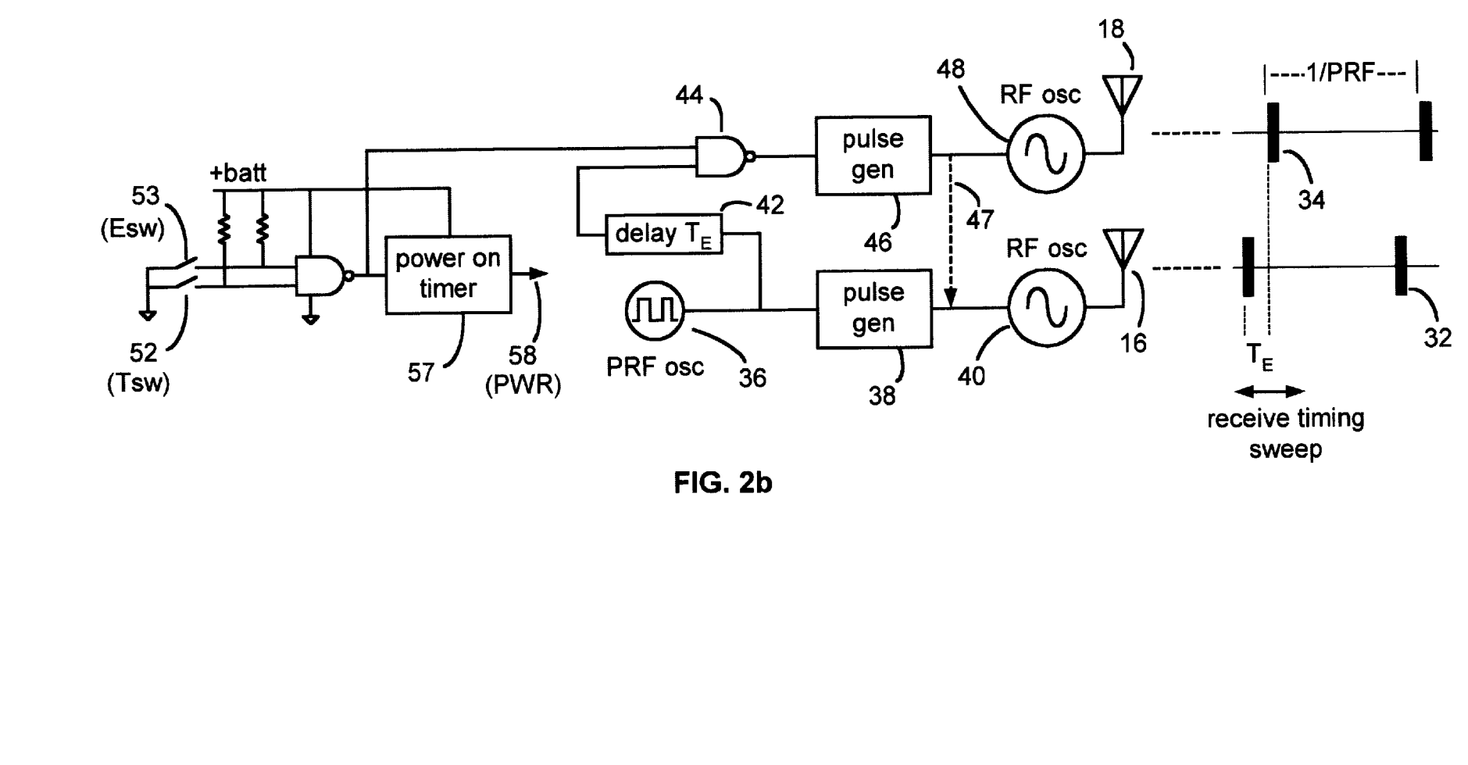

FIG. 2b is a block diagram of the wireless writing pen circuit board 14 of FIGS. 1 and 2a. Transmit antennas 16 and 18 radiate 5.8 GHz RF bursts, each burst comprising one or more RF cycles at 5.8 GHz (or other center frequency); generally each burst contains about 20 cycles and is 3 ns wide. The RF bursts repeat at a pulse repetition frequency PRF of 10 MHz (or other PRF) and have an associated pulse repetition interval PRI of 1/PRF=100 ns. Antenna 16 radiates RF bursts 32 from the tip end of the pen, and antenna 18 radiates delayed RF bursts 34 from the eraser end of the antenna. The RF bursts from the eraser end of the pen are delayed so the receiver circuitry can identify and channel them as eraser end signals.

PRF oscillator 36 is typically a crystal oscillator that provides a 10 MHz squarewave to pulse generator 38, which produces 3 ns wide drive pulses that bias-on 5.8 GHz RF oscillator 40 to produce RF bursts, which are radiated by antenna 16. The RF cycles comprising RF bursts 32 are phase locked to the drive pulses from pulse generator 38, i.e., RF oscillator does not start up randomly with respect to its drive pulses.

Delay element 42 delays the 10 MHz squarewaves from PRF oscillator 36 by 10 ns generally, before coupling to logic gate 44, which outputs a squarewave whenever either switch 52 or 53 is closed. Pulse generator 46, RF oscillator 48, and antenna 18 function similarly to elements 38, 40, and 16.

Switch 52, $T_{SW}$, is a pressure sensitive switch located at the tip of pen 12. It goes to a closed condition whenever downward writing pressure is applied. Switch 53, $E_{SW}$, is a similar pressure sensitive switch located at the eraser end of pen 12, and its closed condition indicates an erase mode. Naturally, switches 52 and 53 may operate on other principles, such as dielectric or optical proximity, but their function remains the same: to indicate an active "ink flow" or "erase" mode, or point, click or drag mouse functions. When either switch 52 or 53 is closed, 10 MHz squarewaves are enabled to pass through gate 44 and commence transmissions from antenna 18. Thus, radiolocation from the eraser end of the pen (at location $L_E$) is enabled only during active "ink flow" or "erase" modes and not when the pen is lifted above writing surface 28. Naturally, this feature may be bypassed and the "ink flow" and "erase" modes may be deduced from radiolocation information with potentially less precision. If only one transmitter is located in pen 12, then switch closure information may be modulated on RF oscillator 40 via dashed line 47 to produce a second, time delayed burst, or to produce a width modulated RF burst. Other means known in the art may be used to convey information such as switch closures by amplitude, frequency, or phase modulation of oscillator 40 or oscillator 48.

A power-on timer 57 is activated whenever switch 52 or 53 is closed to provide power on line 58 (PWR) to elements 36, 38, 40, 44, 46, and 48. The timer keeps PWR on for a duration of about 30 seconds after both switches, 52 and 53, open so RF burst transmissions continue from antenna 16 while the pen is lifted from the writing surface, thereby allowing continued tracking of the pen location when the pen is in the air. Continuous transmissions from at least one antenna, 16 or 18, are also desirable to prevent a loss of lock of a frequency locked loop (FLL) in the receiver (to be discussed with respect to FIGS. 3 and 4). It should be understood that these switch and PWR modes are useful for a writing pen but may not be used in other radiolocation applications such as virtual reality tracking systems.

Figure 3:
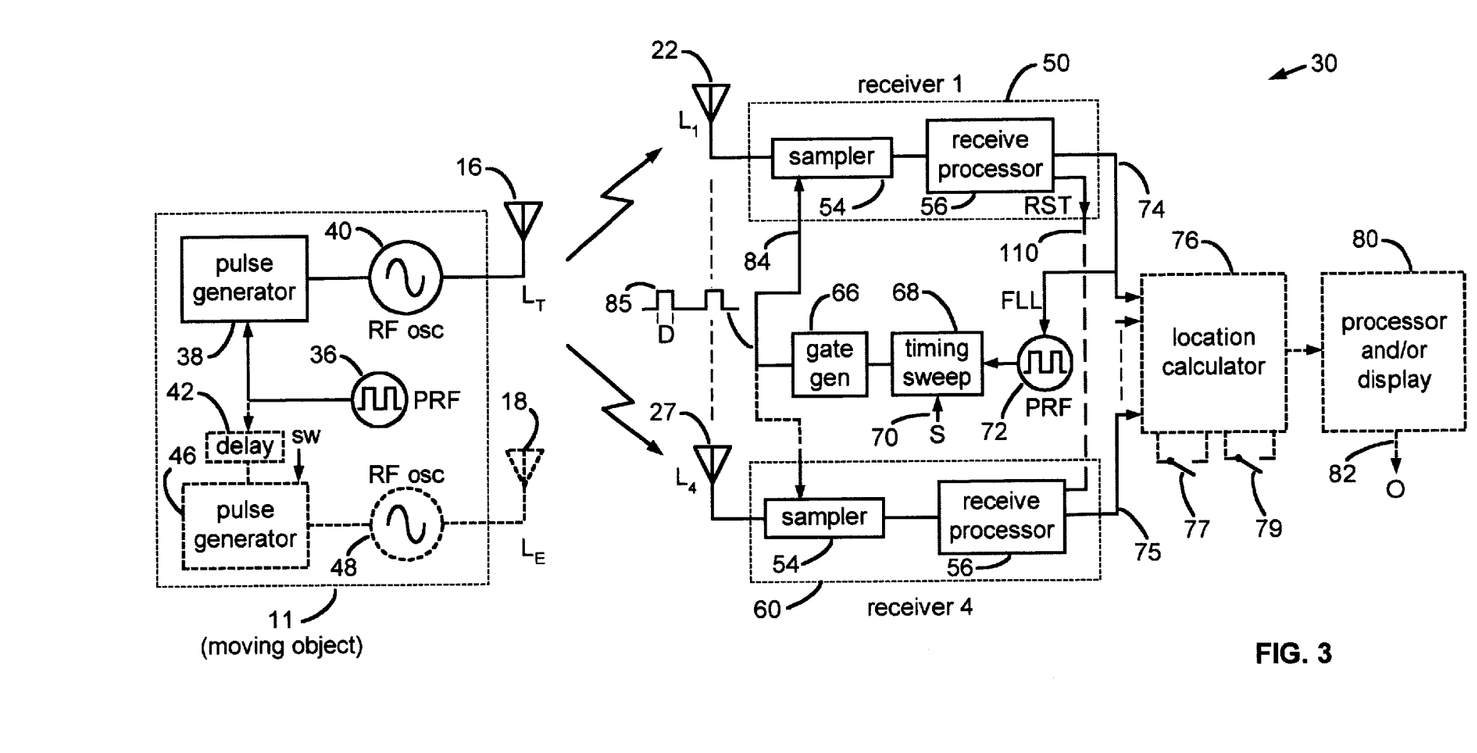
FIG. 3 is a block diagram of a radiolocation system of the present invention.

FIG. 3 is an overall block diagram of a radiolocation system 30. Moving object 11 has an integral transmitter comprised of PRF oscillator 36, which is typically a 10 MHz crystal oscillator, coupled to pulse generator 38, which typically produces 3 ns wide drive pulses, which is coupled to RF oscillator 40. Typically, RF oscillator 40 operates at 5.8 GHz, but may operate at other frequencies or may comprise an equivalent, such as a CW oscillator and an AM modulator responsive to the drive pulses from pulse generator 38. RF oscillator 40 is coupled to antenna 16, which radiates RF bursts from RF oscillator 40 at a PRF set by PRF oscillator 36. Details of RF oscillators similar to RF oscillator 40 can be found in U.S. Pat. No. 6,191,724, "Short Pulse Microwave Transceiver," to McEwan, 2001, and in numerous other patents by McEwan.

Moving object 11 may further contain a second transmitter comprised of elements 42, 46, 48, and antenna 18, having functions similar to the corresponding elements of FIG. 2b. The purpose of the second transmitter is to obtain a second location fix on moving object 11, which may be, for example, pen 12 of FIGS. 1a, 1b, 2a and 2b.

Radiolocation system 30 includes a plurality N (at least 2) receivers: receiver 1 (50) through receiver N (60). For convenience in this description, we let N=4 to correspond to handwriting system 10 and corresponding antennas 22, 24, 25, and 27 at respective locations $L_1$, $L_2$, $L_3$, and $L_4$ as in FIGS. 1a–c. Each receiver includes sampler 54 and processor 56. Antenna 22 of receiver 50 receives RF bursts radiated from moving object 11 and couples them to sampler 54, which performs a sample-hold function in response to gating pulses 85 on line 84. Sampler 54 is responsive to signals from antenna 22 only during a duration D of the gating pulses. In a preferred mode, multiple samples are integrated by sampler 54 to improve signal-to-noise ratio and immunity to RF interference. A preferred implementation for sampler 54 is given in U.S. Pat. No. 6,060,915, "Charge Transfer Wideband Sample-Hold Circuit," to McEwan, 2000, which discloses a peak-detecting type sample-hold circuit that also performs sample integration.

Receive processor 56 detects pulses coupled from sampler 54 and outputs a digital representation on line 74. Receive processor 56 also outputs a reset pulse RST on line 110, which is coupled to all N receivers in system 30. The RST pulse simultaneously resets the digital representations from each receiver. Details of receive processor 56 are provided in the discussion of FIG. 4. Additional receivers and antennas through receiver N (60) and its corresponding antenna 27 provide a total of N digital representations that correspond to RF burst arrival times from each of the corresponding antennas at locations $L_1 \ldots L_N$. For an N-dimensional location fix of moving object 11, N+1 receivers and antennas at N+1 locations are needed (assuming moving object 11 has only one antenna 16).

A total of N digital representations, shown only on lines 74 and 75 from receivers 50, 60 for clarity, are input to optional location calculator 76, which converts time information from the N receivers to relative distance and then calculates the location(s) $L_T$ (and $L_E$) of moving object 11 using general and well-known geometric relations, e.g., as described in a number of the cited references. Moving object location data is coupled from location calculator 76 to an optional processor and/or display (processor or display or both) 80, which may track over time a sequence of locations for moving object 11 to form handwriting, for example, or to plot a trajectory, perhaps with mathematical smoothing or ballistic curve fitting. Additionally the sequence of locations may be displayed as a sketch on a computer screen, or as recognized alphanumeric handwriting after passing through an optical character recognition (OCR) routine. Processor 80 may output processed data O on line 82 for control of a parameter of a machine, vehicle, virtual reality system or computer system.

PRF oscillator 72 is frequency locked to the PRF oscillator 36 via line 74 from receiver 1. Both PRF oscillators 36 and 72 operate at exactly 10.000000 MHz (or other frequency) with no frequency offset Δ between them, in contrast to prior art systems which rely on natural phase slippage produced by a frequency offset Δ to cause a sweeping of gate pulse timing.

The output of PRF oscillator 72 is coupled to a timing sweep circuit 68, which sweeps the delay of a PRF squarewave coupled from PRF generator 72, and the output of timing sweep 68 is coupled to gate generator 66. Typically, the delay linearly sweeps over a span of 20 ns at a 100 Hz repetition rate. The sweeping of timing sweep 68 is controlled by an input S on line 70, generally a voltage ramp from an analog ramp generator or from a D-to-A converter. Gate generator 66 outputs pulses having a duration D of about 0.1 ns (or for the sample-hold of McEwan's '915 patent, equivalently, a transition time of 0.1 ns) and a PRF equal to that of PRF oscillator 72. Sampler 54 outputs an expanded time signal that repeats at a 100 Hz rate, representing events on a 20 ns time scale, such that time appears to be expanded by a factor of 500,000.

Figure 4:
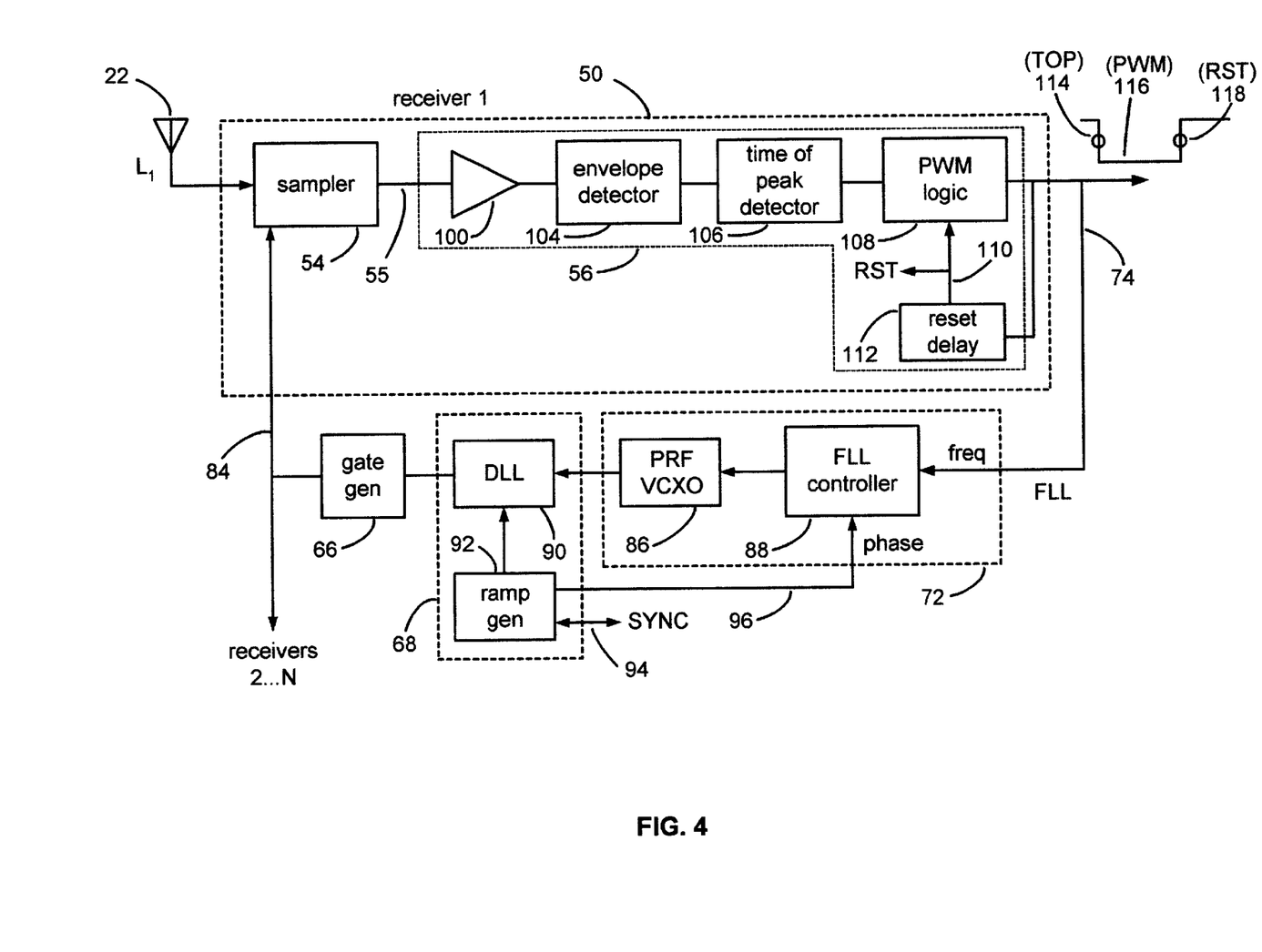
FIG. 4 is a block diagram of a receiver and timing system of the present invention.
Figure 6A:
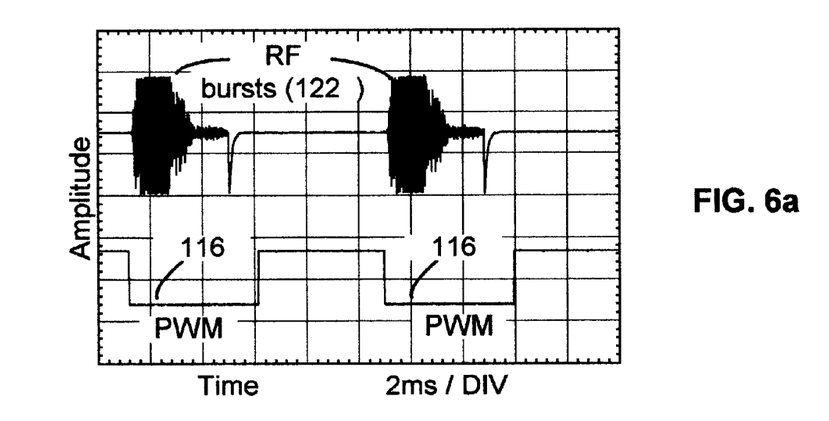
FIG. 6a plots received RF bursts and PWM pulses of the present invention.

FIG. 4 is a detailed block diagram of the receiver 50 and timing system 66, 68, 70 and 72 of FIG. 3. Antenna 22 at known location $L_1$ is coupled to sampler 54, which receives gate pulses on line 84 from gate generator 66. The output of sampler 54 is coupled on line 55 to processor 56, which is comprised of an amplifier 100, an envelope detector 104, time of peak (TOP) detector 106, PWM logic element 108 and reset delay element 112. The output of sampler 54 is a plurality of expanded time pulses that are identical in shape to the realtime pulses received by antenna 22 but on a much longer time scale. Thus, for example, the expanded time RF pulses are audio frequency bursts comprising about 20 sinusoidal cycles at 12 kHz. Each of these audio frequency bursts are envelope detected by envelope detector 104 and then peak detected by TOP detector 106, which outputs a digital edge at the peak of the envelope detected pulse and triggers PWM logic element 108, producing PWM pulse 116 having its leading edge 114 triggered by the TOP detector 106. Reset delay element 112 outputs a reset pulse RST on line 110 after delaying PWM pulse 116 by about 5 ms. The reset pulse RST is applied to PWM logic element 108 and triggers the trailing edge 118 of PWM pulse 116. FIG. 6a is a data plot of RF bursts 122 appearing on line 55 and the corresponding PWM pulses 116 for a prototype writing pen system 10.

For RF bursts in system 30 having a Gaussian RF envelope shape, a differentiator within TOP detector 106 differentiates pulses from envelope detector 104 to produce TOP output pulses when the differentiated pulse amplitudes are zero. The TOP output pulses are applied to a gate within TOP detector 106 along with the output of a threshold detector within TOP detector 106 that is responsive to pulses from envelope detector 104, such that the gate passes pulses that are coupled to PWM logic element 108 when pulses from envelope detector 104 are above a defined minimum amplitude. Thus, PWM pulses 116 are only produced when the RF burst pulses received by antenna 22 have sufficient amplitude. The threshold detector gates off false derivative pulses that normally arise from baseline noise when RF bursts are not present at antenna 22.

For RF bursts in system 30 having a rectangular shape, the differentiator within TOP detector 106 differentiates pulses from envelope detector 104 to produce a derivative pulse having a TOP transition whenever the derivative pulse magnitude equals a fraction of the envelope detector 104 output pulse, forming an offset TOP detector that triggers on a constant fraction of the rise of the pulse from envelope detector 106. Offset TOP detection is required whenever the pulse from envelope detector 106 has a flat top, i.e., a poorly defined peak.

As seen in FIG. 3, reset line 110 is coupled from receiver 1 to all the other receivers in radiolocation system 30. The other receivers 2 . . . N are similar to receiver 1 except for reset delay element 112, which is present only in receiver 1 and resets all the receivers. The width of PWM pulse 116 is fixed for the output of receiver 1 by reset delay element 112. However, the leading edge (corresponding to leading edge 114 from receiver 1) of all the other receivers varies with their respective TOP detection times, while their trailing edges all fall in unison since they are reset together by a common RST pulse. Thus, the widths of the PWM pulses from receivers 2 . . . N vary in proportion to the relative arrival times of RF bursts at their respective receive antennas. The PWM widths are converted to distances by location calculator 76.

In PRF generator 72, PWM pulses from receiver 1 are coupled via line 74 to frequency locked loop FLL controller 88, which outputs a control voltage to PRF VCXO 86 (voltage controlled crystal oscillator) that regulates the exact frequency of the PRF VCXO to match the frequency of PRF oscillator 36 in the moving object.

Timing sweep 68 comprises a delay locked loop (DLL) element 90, which provides a swept delay for 10 MHz squarewaves from PRF VCXO 86. The delay sweep is controlled by ramp generator 92, which may be comprised of an analog ramp generator or a D-to-A converter. Line 94 may output a synchronizing pulse at the start of each ramp (of general duration of 10 ms) to processor/display 80, or line 94 may input a synchronizing pulse from processor/display 80 to initiate a ramp. If ramp generator 92 is comprised of a D-to-A converter, then line 94 may provide a digital input count. Ramp generator 92 also provides a signal on line 96 to FLL controller 88 to phase lock the controller to the ramp generator. While the complete system 30 could function in principle using frequency locking only, phase locking to the DLL ramp on line 96 provides a faster control loop acquisition within controller 88. Details of a FLL control having a phase lock port are provided in U.S. Pat. No. 6,024,427, "Precision Radar Timebase Using Harmonically Related Offset Oscillators," to McEwan, 1999, and in copending U.S. patent application Ser. No. 09/282, 947, "Self Locking Dual Frequency Clock System," by McEwan.

DLL 90 outputs squarewaves to gate generator 66, which generates ~0.1 ns wide gate pulses to the receiver samplers 54 via line 84, as has been described with respect to FIG. 3.

It should be understood that the PRF of the gate pulses on line 84 exactly matches the PRF of PRF oscillator 36 in the moving object. This condition of exactness is realized by phase locking the FLL controller to the ramp generator. Since the ramp generator sweeps at a 100 Hz rate, PWM pulse 116 must repeat at a 100 Hz rate for phase locking to occur in FLL controller 88, and this can only happen if the PRF of the gate pulses on line 84 exactly matches the PRF of PRF oscillator 36 in the moving object; otherwise, if they don't match, the frequency of the PWM pulses will not match the ramp generator frequency and neither frequency nor phase locking can occur in FLL controller 88.

Figure 5:
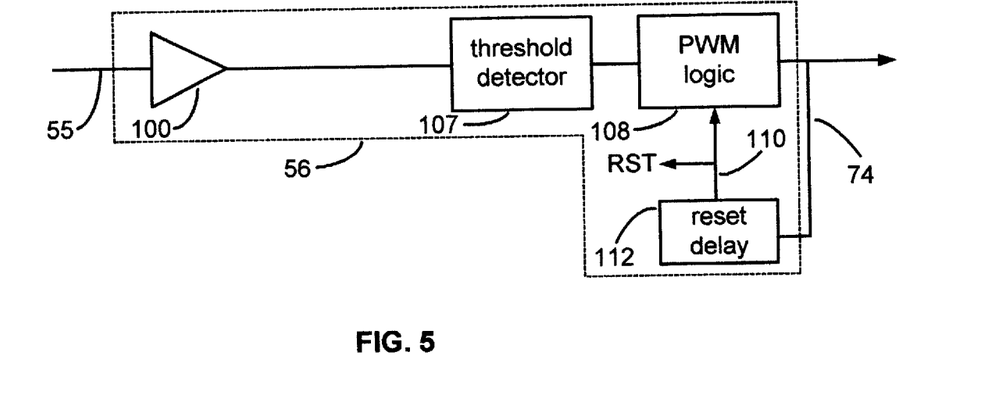
FIG. 5 is a block diagram of an alternative receive processor of the present invention.
Figure 6B:
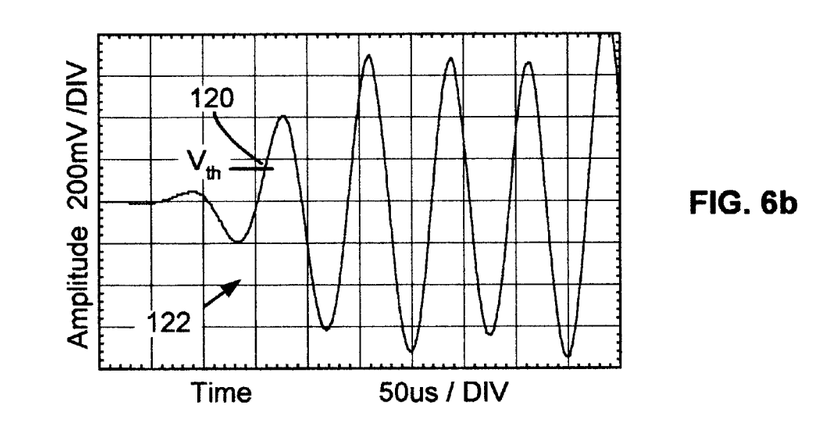
FIG. 6b is an expanded scale plot of received RF bursts of the present invention.

FIG. 5 is a block diagram of an alternative receive processor 56. Line 55 couples the output of sampler 54 (of FIG. 4) to amplifier 100, and amplifier 100 outputs a plurality of expanded time pulses that are identical in shape to the realtime RF bursts received by antenna 22 but on a much longer time scale (as described with reference to FIG. 4). The expanded time bursts are threshold detected by threshold detector 107, which outputs a digital pulse for each threshold crossing of its input and triggers PWM logic element 108, producing PWM pulse 116 having its leading edge 114 triggered by the threshold detector. Reset delay element 112 functions as described with reference to FIG. 4. Operation with threshold detector 107 can be termed phase detection, since PWM logic element 108 is triggered on an individual cycle (typically the first cycle) within an expanded time RF burst from amplifier 100. FIG. 6b is a data plot showing detection point 120 when the first positive cycle of the sampled 5.8 GHz RF burst 122 on line 55 crosses a threshold voltage $V_{th}$ of threshold detector 107.

In contrast, a receive processor 56 employing an envelope detector 104 and TOP detector 106 of FIG. 4 can be termed a magnitude detector since the envelope detection process strips away phase information. Phase detection provides a factor of ten improvement in accuracy over magnitude detection but it is prone to full cycle jumps, producing large discontinuous errors. Phase detection is most suitable for short-range applications where the propagation environment can be controlled, such as for handwriting digitizing systems. A more elaborate phase detection system than that of FIG. 5 is disclosed in U.S. Pat. No. 6,137,438 "Precision Short-Range Pulse-Echo Systems with Automatic Pulse Detectors," to McEwan, 2000, which is less likely to exhibit erroneous full cycle phase jumps. There are other carrier phase detection means known in the art.

Figure 6C:
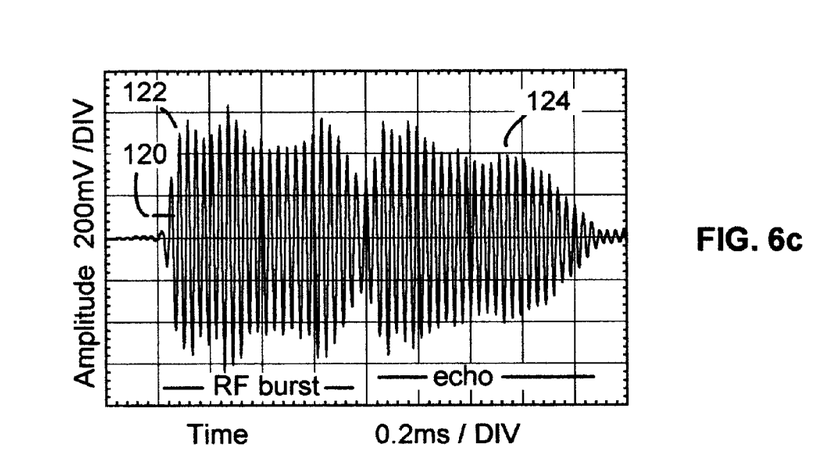
FIG. 6c is a plot of received RF bursts and RF burst echoes of the present invention.

FIG. 6c is a data plot of an expanded time signal from sampler 54 on line 55. RF burst 122 consists of about 22 cycles, corresponding to a 3.8 ns wide RF burst at 5.8 GHz. An echo burst 124 appears immediately after RF burst 122. Although the amplitude of echo 124 is nearly the same as that of the direct pulse, the echo pulse has no effect since it occurs well after the threshold trigger point 120. Echo 124 appears to reflect off the user in front of tablet 20, since user movement alters its amplitude.

If system 10 relied on ultrasound rather than RF, an acoustic echo comparable in magnitude to that of FIG. 6c (124) could occur. However, the propagation time scale for ultrasound is 1-million times slower than for RF, such that an ultrasonic echo may return after 5 or 10 ms, creating an ambiguity if the PRI is 5 or 10 ms. Thus, the maximum practical PRF for ultrasound is 100 or 200 Hz, too slow for accurate tracking of handwriting.

Figure 7:
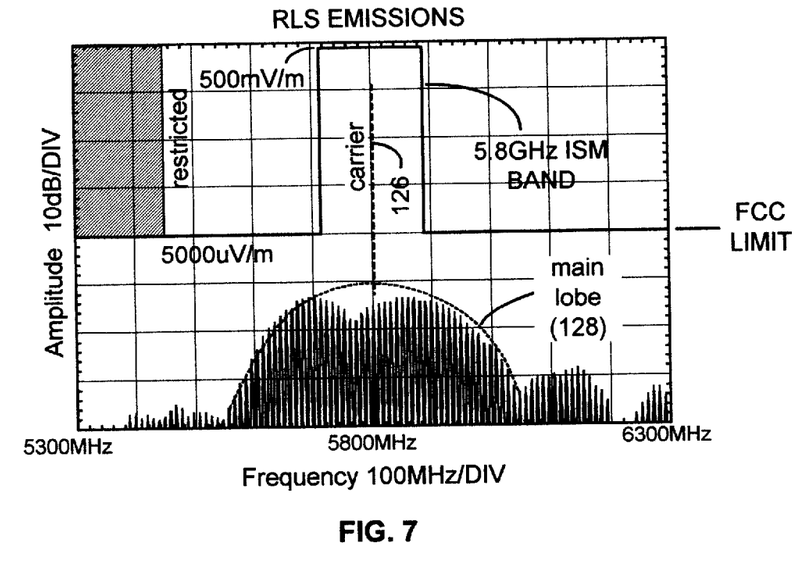
FIG. 7 plots the RF emission spectrum of a writing pen transmitter of the present invention.

FIG. 7 is a data plot of the RF burst spectrum emitted by writing pen 12 of system 10. The corresponding RF bursts 122 are plotted in FIGS. 6a, 6b, and 6c. An important aspect of the present invention is that its emissions fall beneath FCC and most global regulatory limits in order to achieve commercial success. The FCC limits given in FIG. 7 correspond to FCC Part 15 limits for emitters having less than 10% RF duty cycle. A dashed line marked "carrier" 126 shows the center frequency if the RF burst width were extended to CW, which should fall within the 5.8 GHz ISM band, as shown. The main lobe 128 must not extend into a restricted band.

Figure 8:
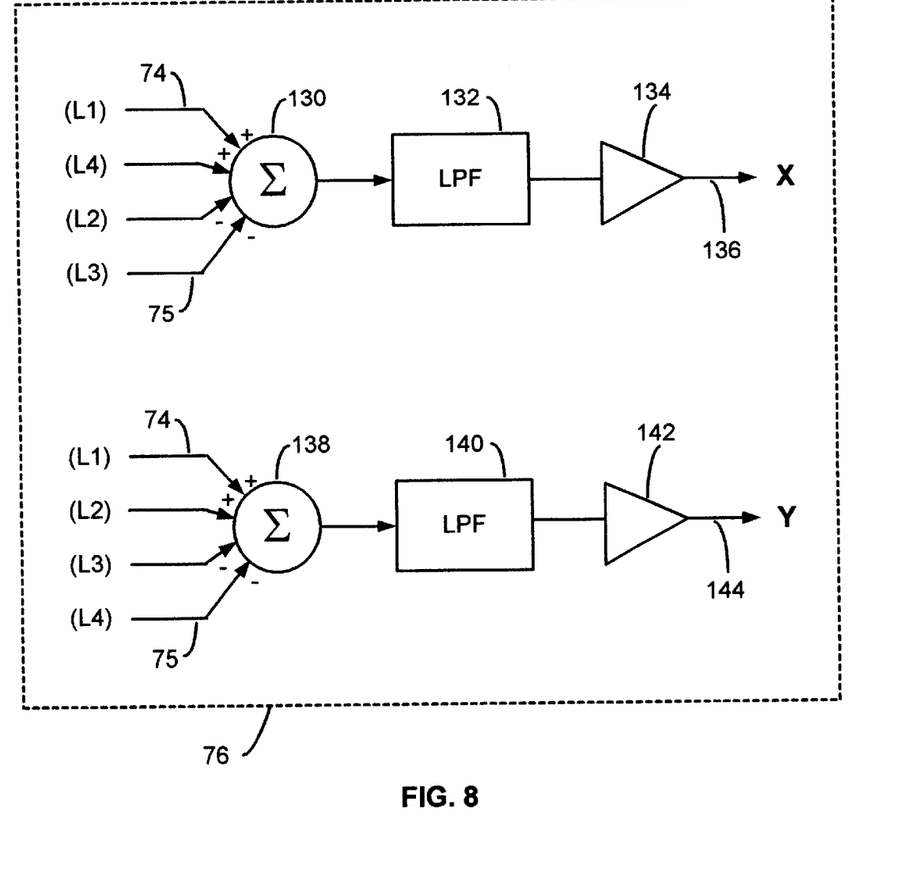
FIG. 8 is a block diagram of a proportional-to-voltage X–Y converter of the present invention.

FIG. 8 is a block diagram of an analog location processor 76, which receives PWM inputs from four receive processors 56 of FIG. 3 on lines 74, 75 (and two unlabeled intervening lines), corresponding to signals from antenna locations $L_1$, $L_2$, $L_3$, and $L_4$. Analog voltage summation element 130 adds signals from receivers 56 connected to antennas L1, L4 and subtracts signals from receivers 56 connected to antennas L2, L3. Summation element 130 is coupled to a lowpass filter (LPF) 132 to smooth the PWM pulses into a ripple-free voltage that is proportional to the horizontal or X position of pen 12 on tablet 20. LPF 132 is coupled to amplifier 134, which outputs a 0 to 5-volt level (or other voltage range) on line 136 corresponding to the X position of pen 12. Elements 138, 140, and 142 function in a similar fashion to corresponding elements 130, 132, and 134 to provide a proportional voltage on line 144 corresponding to vertical or Y position of pen 12. Summation element 138 adds signals from receivers 56 connected to antennas L1, L2 and subtracts signals from receivers 56 connected to antennas L3, L4. The proportional X and Y voltages can be applied to X and Y inputs of a plotter or oscilloscope, or to a control device via line 82 of FIG. 3. Outputs X and Y on lines 136, 144 are linear approximations to a location solution for pen 12, with some pincushion distortion across writing pad 29. The location calculation method of FIG. 8 is attractive mainly from a cost or simplicity standpoint, or where the pincushion distortion can be corrected with further analog components or digitally in processor 80. A precise solution without pincushion distortion can be calculated using digital techniques to compute pen location with standard geometric relations.

Figure 9A:
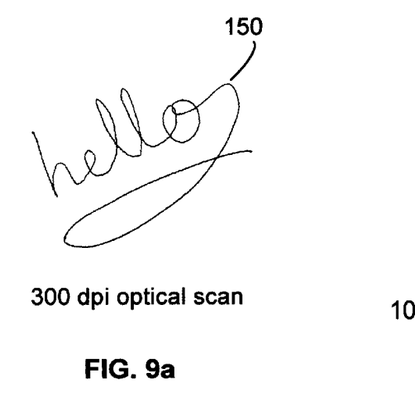
FIG. 9a is a sample of optically scanned handwriting written in ink from the present invention.

FIG. 9a is a 300 dpi optical scan of handwriting on pad 29 from pen 12, with a standard ballpoint pen cartridge attached to pen 12 to produce handwriting for scanning into image 150.

Figure 9B:
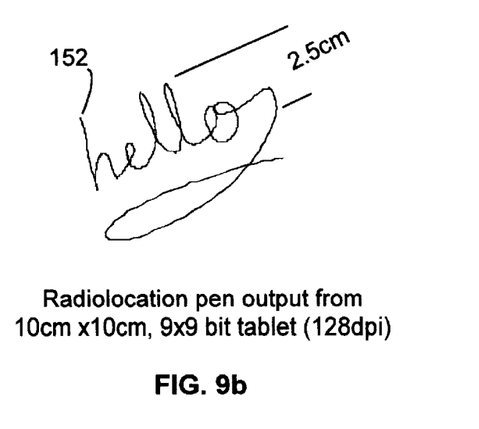
FIG. 9b is a sample of digitized handwriting obtained simultaneously with the writing of FIG. 9a using an apparatus of the present invention.

FIG. 9b is digitized handwriting from radiolocation system 10 obtained simultaneously with the ballpoint handwriting of FIG. 9a. Radiolocation system 10 was coupled to an analog location calculator 76 as detailed in FIG. 8, and image 152 was displayed on a digital oscilloscope having 9×9 bit resolution across a 10×10 cm screen. Image 152 was captured by the oscilloscope and then acquired and printed with a computer. As can be seen, image 152 exhibits reasonably faithful reproduction of handwriting, albeit with fax quality resolution of 128 dpi, as defined by the 9×9 bit oscilloscope used in testing the prototype.

Figure 9C:
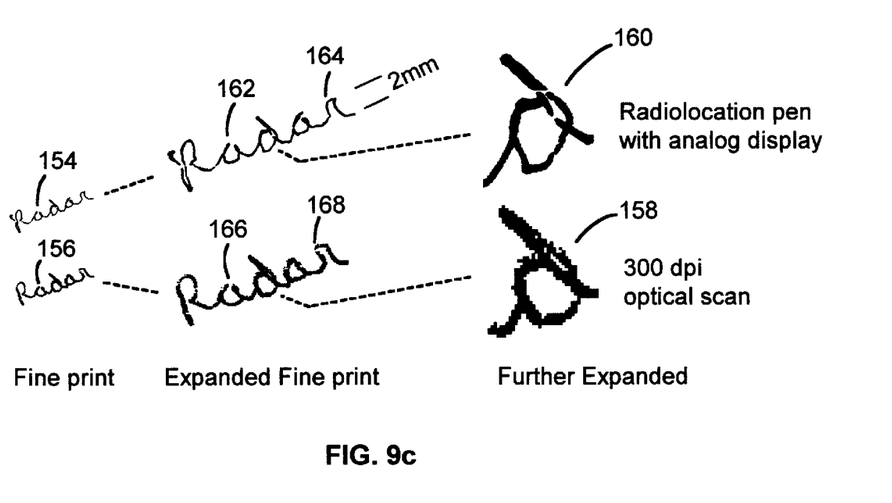
FIG. 9c compares optically scanned small print handwriting to the same handwriting obtained simultaneously from an apparatus of the present invention.

FIG. 9c shows a digitized handwriting image 154 obtained with radiolocation system 10 and displayed on an analog storage oscilloscope, and then acquired from the oscilloscope with a 3.3 mega-pixel digital camera. Image 156 is simultaneous ballpoint writing obtained from a 300 dpi optical scan of paper on writing pad 29 using a flatbed scanner rated at 1200 dpi optical resolution. The character height is 2 mm. Expansion of the letter "d" 158 for the optically scanned image shows pixelization at 300 dpi. The nearly complete lack of pixelization or other edge noise for letter "d" 160 from system 10 indicates an estimated resolution of 1000 dpi. This resolution has been verified by examining the edge jitter on PWM pulses 116, where the peak-to-peak jitter corresponded to 0.0016 inches (625 dpi), or 0.00025 inches rms (4000 dpi rms). The corresponding realtime jitter on the sampled RF bursts is 0.02 picoseconds rms. The circle on the letter "d" 160 is 2 mm tall, and represents a time span of 6.6 picoseconds at the speed of light.

Several defects can be seen in the radiolocation image 154 at point 162 in comparison to the optically scanned image at point 166. The lack of closure in the letter "a" 162 and the down stroke opening on the adjacent letter "R" can be attributed to slow response introduced by LPFs 132, 140 of location processor 76 as described with respect to the analog version of FIG. 8. Slow processor response also caused letter "r" 164 to bend to the right relative to the optically scanned version 168.

System 10 response time is directly dependent on the data update rate, which was 100 Hz for all the images of FIGS. 9a, 9b and 9c. To properly smooth samples of dynamic data into a jitter-free approximation of the original input data, i.e., pen motion, a sample-smoothing filter having a risetime spanning at least 2 sample intervals is required. Accordingly, lowpass filters 132, 140 having a 20-millisecond 10–90% risetime were used in processor 76 of FIG. 8. However, the time required to form the letter "a" 162 may be on the order of 100 ms, and a 20 ms response time is 20% of the time it takes to form the "a", and thus some of the letter does not get formed, resulting in an enlarged opening at the top of the letter. For accurate handwriting reproduction, the sample rate should be at least 200 Hz and preferably 400 Hz, a rate easily achievable with radiolocation system 10 but nearly impossible to achieve with an ultrasound system due to pulse rate limitations.

Applications include low-cost digitizing of handwriting with simultaneous control of computer functions like point, click and drag; wireless 3-D computer mice; CRT-based input devices for technical software, cashiering and games; automated machine control; virtual reality systems; digital surgery devices; and inventory tracking.

Changes and modifications in the specifically described embodiments can be carried out without departing from the scope of the invention, which is intended to be limited only by the scope of the appended claims.

What is claimed is:

1. A radiolocation system for tracking a wireless moving object, comprising:
    a transmitter, integral with the moving object, for transmitting a plurality of RF bursts at a transmit PRF;
    a plurality of receivers, at known relative positions, for receiving the RF bursts upon receipt of gating pulses and outputting a digital representation of the received RF bursts; and
    circuitry for generating a plurality of gating pulses at the transmit PRF and swept in time relative to the transmit RF bursts, and for supplying the gating pulses substantially simultaneously to each of the receivers, each of the receivers then receiving the RF bursts for the duration of the gating pulses.

2. The system of claim 1 further comprising circuitry for calculating the location of the moving object relative to the receivers based on at least two digital representations outputted by the plurality of receivers.

3. The system of claim 2 further comprising circuitry for processing a sequence of locations of the moving object for display or control of a machine or computer variable.

4. The system of claim 1 further comprising a second transmitter, integral with the moving object, for providing delayed RF bursts for radiolocation.

5. The system of claim 1 wherein the system is a position location element of a handwriting digitizing system, a wireless computer mouse, a CRT-based input device, an automated machine control system, a virtual reality system, a digital surgery device, or an inventory tracking system.

6. A method for tracking a wireless moving object, comprising:
    transmitting a plurality of RF bursts at a PRF from the moving object;
    providing a plurality of receivers at known relative positions;
    generating a plurality of gating pulses at the PRF and sweeping the occurrence time of the gating pulses relative to the RF bursts;
    receiving the RF bursts, at each of the receivers; and
    producing digital representations of the RF bursts in response to the gating pulses.

7. The method of claim 6, further comprising calculating from the digital representations the location of the moving object relative to the receivers.

8. The method of claim 7 further comprising processing a sequence of locations of the moving object for display or for control of a machine or computer variable.

9. A handwriting digitization system comprising:
    a wireless pen including a transmitter for transmitting a plurality of RF bursts at a PRF;
    a plurality of receivers, each having an antenna at a known position for receiving RF bursts upon receipt of a gating pulse and outputting a digital representation of the received RF bursts;
    circuitry for generating a plurality of gating pulses at the PRF and swept in time relative to the RF bursts, and for supplying the gating pulses substantially simultaneously to the receivers, the receivers then receiving the RF bursts in response to the gating pulses.

10. The system of claim 9 further comprising circuitry for calculating the location of the wireless pen relative to the receivers based on at least two digital representations outputted by the plurality of receivers.

11. The system of claim 9 further comprising a second transmitter in the wireless pen for transmitting a plurality of RF bursts at the PRF and delayed in time relative to RF bursts from the first transmitter.

12. A method of digitizing handwriting written by a user using a wireless pen, comprising:
    transmitting, from the wireless pen, a plurality of RF bursts at a PRF;
    providing a plurality of receivers, each of the receivers having an antenna at a known position;
    generating a plurality of gating pulses at the PRF which are swept in time relative to the RF bursts, each of the gating pulses having a duration;
    receiving the RF bursts at each of the receivers within the durations of the gating pulses;
    producing digital representations of the RF bursts received by the receivers.

13. The method of claim 12, further comprising calculating, from the digital representations, corresponding positions of the wireless pen.

14. The method of claim 13, further comprising translating the positions of the wireless pen to alphanumeric characters.

15. The method of claim 13, further comprising calibrating the location of the wireless pen when the pen is positioned at one or more known locations.

16. A radiolocation system for tracking a wireless moving object, comprising:
    a transmitter, integral with the moving object, for transmitting a plurality of RF bursts at a transmit PRF;
    a plurality of receivers, at known relative positions, for receiving the RF bursts upon receipt of gating pulses and outputting a digital representation of the received RF bursts;
    a receive PRF generator for receiving a digital representation from a receiver and for providing a PRF at the exact frequency of the transmit PRF;
    a timing sweep coupled to the receive PRF generator for sweeping the gating pulses over a range of delays relative to the transmitted RF bursts; and
    a gate generator coupled to the timing sweep for generating a plurality of gating pulses at the transmit PRF and swept in time relative to the transmit RF bursts, and for supplying the gating pulses substantially simultaneously to each of the receivers, each of the receivers then receiving the RF bursts for the duration of the gating pulses.

17. The system of claim 16 further comprising a frequency lock loop controller for locking the receive PRF to the transmit PRF.

18. The system of claim 16 further comprising a delay lock loop circuit for sweeping the timing of the gate pulses.

19. A method for tracking a wireless moving object, comprising:
- transmitting a plurality of RF bursts at a transmit PRF from the moving object;
- providing a plurality of receivers at known relative positions;
- locking a receive PRF generator to the exact frequency of the transmit PRF;
- generating a plurality of gating pulses having a duration at the transmit PRF;
- sweeping the occurrence time of the gating pulses relative to the RF bursts;
- receiving the RF bursts during the duration of the gating pulses at each of the receivers;
- producing digital representations of the RF bursts in response to the gating pulses.

20. The method of claim 19, further comprising frequency and phase locking the receive PRF generator to the transmit PRF.

21. The method of claim 19 further comprising locking the occurrence time of the gating pulses to a control voltage.

* * * * *